US007293359B2

(12) United States Patent
Shaarawi et al.

(10) Patent No.: US 7,293,359 B2
(45) Date of Patent: Nov. 13, 2007

(54) METHOD FOR MANUFACTURING A FLUID EJECTION DEVICE

(75) Inventors: Mohammed S. Shaarawi, Corvallis, OR (US); Benjamin L. Clark, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 400 days.

(21) Appl. No.: 10/834,777

(22) Filed: Apr. 29, 2004

(65) Prior Publication Data

US 2005/0243141 A1 Nov. 3, 2005

(51) Int. Cl.
*B21D 53/76* (2006.01)
*G01D 15/00* (2006.01)

(52) U.S. Cl. ......................... 29/890.1; 29/830; 29/831; 29/832; 216/27

(58) Field of Classification Search ............... 29/890.1, 29/830, 831, 832, 611; 216/27.2, 57, 49, 216/27, 2; 347/37, 47, 54, 65, 70–72, 85; 438/21; 156/634; 430/320
See application file for complete search history.

(56) References Cited

U.S. PATENT DOCUMENTS

| | | | | |
|---|---|---|---|---|
| 4,229,265 | A | 10/1980 | Kenworthy | |
| 4,246,076 | A | 1/1981 | Gardner | |
| 4,296,421 | A | 10/1981 | Hara et al. | |
| 4,374,707 | A | 2/1983 | Pollack | |
| 4,412,224 | A | 10/1983 | Sugitani | |
| 4,438,191 | A | 3/1984 | Cloutier et al. | |
| 4,455,561 | A | 6/1984 | Boyden et al. | |
| 4,528,577 | A | 7/1985 | Cloutier et al. | |
| 4,532,530 | A | 7/1985 | Hawkins | |
| 4,789,425 | A | 12/1988 | Drake et al. | |
| 4,984,664 | A | 1/1991 | Sugano | |
| 5,016,024 | A | 5/1991 | Lam et al. | |
| 5,122,812 | A | 6/1992 | Hess et al. | |
| 5,159,353 | A | 10/1992 | Fasen et al. | |
| 5,167,776 | A | 12/1992 | Bhaskar et al. | |
| 5,211,806 | A | 5/1993 | Wong et al. | |
| 5,236,572 | A | 8/1993 | Lam et al. | |
| 5,322,594 | A * | 6/1994 | Bol | 216/27 |
| 5,635,968 | A | 6/1997 | Bhaskar et al. | |
| 5,796,416 | A | 8/1998 | Silverbrook | |
| 6,007,188 | A | 12/1999 | MacLeod et al. | |
| 6,045,215 | A | 4/2000 | Coulman | |
| 6,113,216 | A | 9/2000 | Wong | |
| 6,113,221 | A | 9/2000 | Weber | |

(Continued)

OTHER PUBLICATIONS

Aden, J. Stephen et al., The Third-Generation HP Thermal InkJet Printhead, Hewlett-Packard Journal, Feb. 1994, pp. 41-45.

(Continued)

*Primary Examiner*—A. Dexter Tugbang
*Assistant Examiner*—Tai Van Nguyen

(57) ABSTRACT

A method for manufacturing a fluid ejection device includes providing a sacrificial structure substantially overlying a semiconductor substrate. The structure has a shape configured to define an ink chamber, ink manifold, and a nozzle. The method also includes providing a first metal adjacent the sacrificial structure and substantially overlying the substrate and removing the sacrificial structure to form the ink chamber and the nozzle. The method further includes removing a portion of the first and second sacrificial materials to form the sacrificial structure.

41 Claims, 6 Drawing Sheets

U.S. PATENT DOCUMENTS

| | | | | |
|---|---|---|---|---|
| 6,123,413 | A | 9/2000 | Agarwal et al. | |
| 6,155,676 | A | 12/2000 | Etheridge, III et al. | |
| 6,161,923 | A | 12/2000 | Pidwerbecki et al. | |
| 6,180,427 | B1 | 1/2001 | Silverbrook | |
| 6,227,654 | B1 | 5/2001 | Silverbrook | |
| 6,243,113 | B1 | 6/2001 | Silverbrook | |
| 6,244,691 | B1 | 6/2001 | Silverbrook | |
| 6,254,219 | B1 | 7/2001 | Agarwal et al. | |
| 6,267,471 | B1 | 7/2001 | Ramaswami et al. | |
| 6,273,544 | B1 | 8/2001 | Silverbrook | |
| 6,299,294 | B1 | 10/2001 | Regan | |
| 6,299,300 | B1 | 10/2001 | Silverbrook | |
| 6,305,788 | B1 | 10/2001 | Silverbrook | |
| 6,309,048 | B1 | 10/2001 | Silverbrook | |
| 6,310,639 | B1 | 10/2001 | Kawamura et al. | |
| 6,315,384 | B1 | 11/2001 | Ramaswami et al. | |
| 6,318,849 | B1 | 11/2001 | Silverbrook | |
| 6,322,201 | B1 | 11/2001 | Beatty et al. | |
| 6,328,405 | B1 | 12/2001 | Weber et al. | |
| 6,336,713 | B1 | 1/2002 | Regan et al. | |
| 6,357,865 | B1 * | 3/2002 | Kubby et al. | 347/68 |
| 6,364,461 | B2 | 4/2002 | Silverbrook | |
| 6,365,058 | B1 | 4/2002 | Beatty et al. | |
| 6,371,596 | B1 | 4/2002 | Maze et al. | |
| 6,375,313 | B1 | 4/2002 | Adavikolanu et al. | |
| 6,390,603 | B1 | 5/2002 | Silverbrook | |
| 6,402,296 | B1 | 6/2002 | Cleland et al. | |
| 6,402,300 | B1 | 6/2002 | Silverbrook | |
| 6,416,167 | B1 | 7/2002 | Silverbrook | |
| 6,420,196 | B1 | 7/2002 | Silverbrook | |
| 6,423,241 | B1 | 7/2002 | Yoon et al. | |
| 6,425,651 | B1 | 7/2002 | Silverbrook | |
| 6,439,689 | B1 | 8/2002 | Silverbrook | |
| 6,439,699 | B1 | 8/2002 | Silverbrook | |
| 6,443,558 | B1 | 9/2002 | Silverbrook | |
| 6,451,216 | B1 | 9/2002 | Silverbrook | |
| 6,460,778 | B1 | 10/2002 | Silverbrook | |
| 6,460,971 | B2 * | 10/2002 | Silverbrook | 347/54 |
| 6,464,340 | B2 | 10/2002 | Silverbrook | |
| 6,475,402 | B2 | 11/2002 | Nordstrom et al. | |
| 6,481,831 | B1 | 11/2002 | Davis et al. | |
| 6,482,574 | B1 * | 11/2002 | Ramaswami et al. | 430/320 |
| 6,488,358 | B2 | 12/2002 | Silverbrook et al. | |
| 6,488,362 | B2 | 12/2002 | Silverbrook | |
| 6,489,084 | B1 | 12/2002 | Pidwerbecki et al. | |
| 6,491,833 | B1 | 12/2002 | Silverbrook | |
| 6,503,408 | B2 | 1/2003 | Silverbrook | |
| 6,505,912 | B2 | 1/2003 | Silverbrook et al. | |
| 6,508,546 | B2 | 1/2003 | Silverbrook | |
| 6,520,624 | B1 | 2/2003 | Horvath et al. | |
| 6,530,653 | B2 | 3/2003 | Le et al. | |
| 6,535,237 | B1 | 3/2003 | Wong | |
| 6,540,325 | B2 | 4/2003 | Kawamura et al. | |
| 6,543,880 | B1 | 4/2003 | Akhavain et al. | |
| 6,547,364 | B2 | 4/2003 | Silverbrook | |
| 6,547,371 | B2 | 4/2003 | Silverbrook | |
| 6,557,978 | B2 | 5/2003 | Silverbrook | |
| 6,561,625 | B2 | 5/2003 | Maeng et al. | |
| 6,588,882 | B2 | 7/2003 | Silverbrook | |
| 6,598,964 | B2 | 7/2003 | Silverbrook | |
| 6,623,108 | B2 | 9/2003 | Silverbrook | |
| 6,627,467 | B2 * | 9/2003 | Haluzak et al. | 438/21 |
| 6,634,735 | B1 | 10/2003 | Silverbrook | |
| 6,641,254 | B1 | 11/2003 | Boucher et al. | |
| 6,644,786 | B1 | 11/2003 | Lebens | |
| 6,644,793 | B2 | 11/2003 | Silverbrook | |
| 6,648,453 | B2 | 11/2003 | Silverbrook | |
| 6,652,074 | B2 | 11/2003 | Silverbrook | |
| 6,652,082 | B2 | 11/2003 | Silverbrook | |

OTHER PUBLICATIONS

Beeson, Rob, Thermal Inkjet: Meeting the Applications Challenge, printed from website http://www.hp.com/oeminkjet/reports/techpress-6.pdf on Jan. 7, 2004, 4 pages.

Lee, Jae-Duk et al., A Thermal Inkjet Printhead with a Monolithically Fabricated Nozzle Plate and Self-Aligned Ink Feed Hole, Journal of Microelectromechanical Systems, vol. 8, No. 3, Sep. 1999, pp. 229-236.

* cited by examiner

METHOD FOR MANUFACTURING A FLUID EJECTION DEVICE

BACKGROUND

Fluid ejection devices for use in fluid ejection assemblies, such as ink jet printers, utilize fluid ejection devices (e.g., ink cartridges) that include printheads that include an ink chamber and manifold and a plurality of nozzles or apertures through which ink is ejected from the printhead onto a print or recording medium such as paper. The microfluidic architecture used to form the chamber and nozzles may include a semiconductor substrate or wafer having a number of electrical components provided thereon (e.g., a resistor for heating ink in the chamber to form a bubble in the ink, which forces ink out through the nozzle).

The chamber, manifold, and nozzle may be formed from layers of polymeric materials. One difficulty with the use of polymeric materials to form the nozzle and chamber is that such materials may become damaged or degraded when used with particular inks (e.g., inks having relatively high solvent contents, etc.).

Another difficulty with the use of polymeric materials is that such materials may become damaged or degraded when subjected to certain temperatures that may be reached during operation of the printhead. For example, certain known polymers used to form the printhead may begin to degrade at temperatures between approximately 70° C. and 80° C. or higher.

DETAILED DESCRIPTION OF THE EXAMPLE EMBODIMENTS

According to an example embodiment, a method or process for producing or manufacturing a printhead (e.g., a thermal ink jet printhead) includes utilizing a sacrificial structure as a mold or mandrel for a metal or metal alloy that is deposited thereon, after which the sacrificial structure is removed. The sacrificial structure defines a chamber and manifold for storing ink and a nozzle in the form of an aperture or opening (e.g., an orifice) through which ink is ejected from the printhead. According to an example embodiment, the metal or metal alloy is formed using a metal deposition process, nonexclusive and nonlimiting examples of which include electrodeposition processes, electroless deposition processes, physical deposition processes (e.g., sputtering), and chemical vapor deposition processes.

One advantageous feature of utilizing metals to form the nozzle and chamber layers of the printhead is that such metals may be relatively resistant to inks (e.g., high solvent content inks) that may degrade or damage structures conventionally formed of polymeric materials and the like. Another advantageous feature is that such metal or metal alloy layers may be subjected to higher operating temperatures than can conventional printheads. For example, polymeric materials used in conventional printheads may begin to degrade at between 70° C. and 80° C. In contrast, metal components will maintain their integrity at much higher temperatures.

Figure 1:
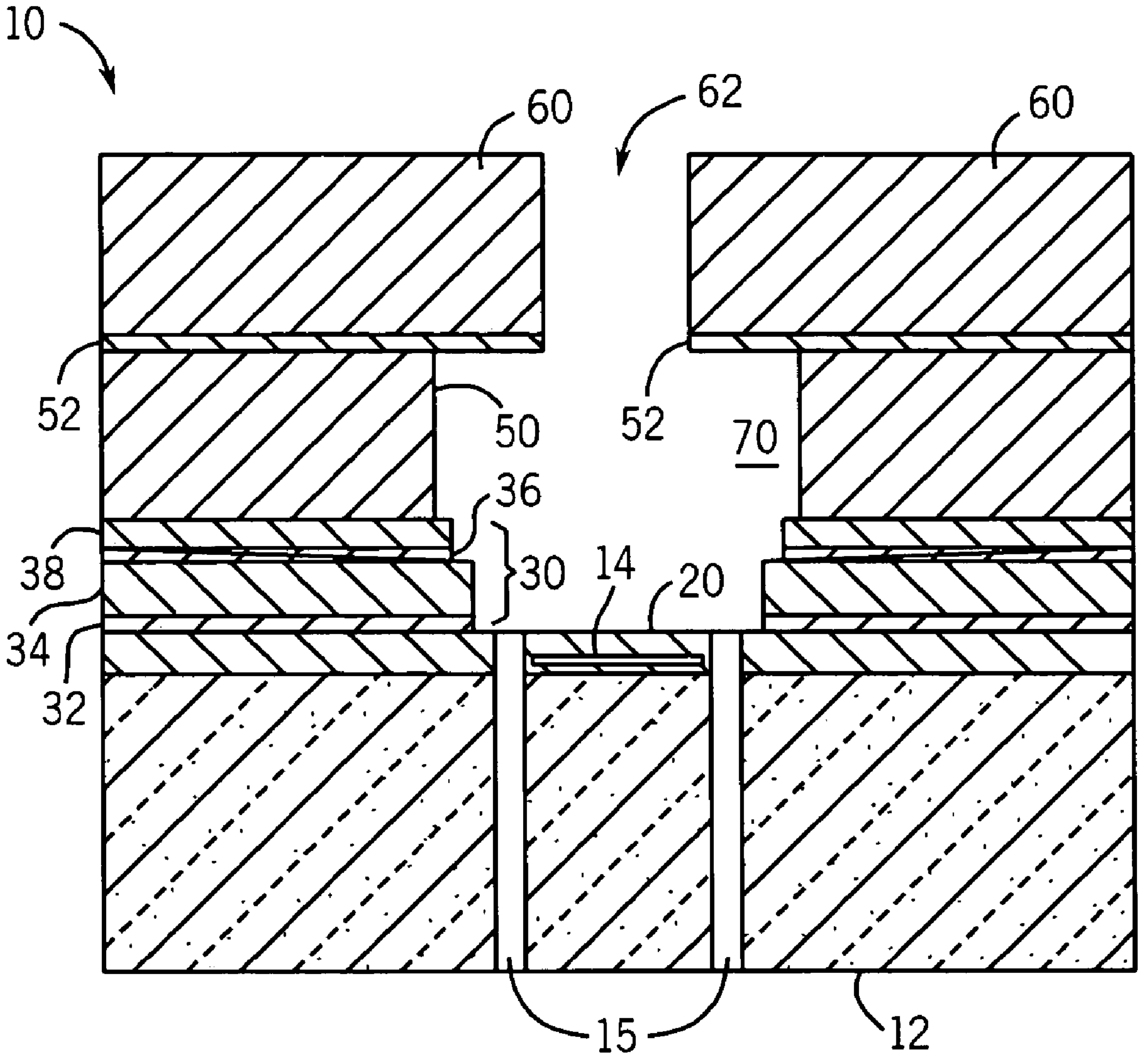
FIG. 1 is a schematic cross-sectional view of a portion of a printhead according to an example embodiment.

FIG. 1 is a schematic cross-sectional view of a portion of a thermal ink jet printhead 10 according to an example embodiment. Printhead 10 includes a chamber 70 that receives ink from ink feed channels 15. Ink is ejected from chamber 70 through an opening 62, which in one embodiment is a nozzle, onto a print or recording medium such as paper when printhead 10 is in use.

Printhead 10 includes a substratum 12 such as a semiconductor or silicon substratum. According to other embodiments, any of a variety of semiconductor materials may be used to form substratum 12. For example, a substrate may be made from any of a variety of semiconductor materials, including silicon, silicon-germanium, (or other germanium-containing materials), or the like. The substrate may also be formed of glass ($SiO_2$) according to other embodiments.

A member or element in the form of a resistor 14 is provided above substratum 12. Resistor 14 is configured to provide heat to ink contained within chamber 70 such that a portion of the ink vaporizes to form a bubble within chamber 70. As the bubble expands, a drop of ink is ejected from opening 62. Resistor 14 may be electrically connected to various components of printhead 10 such that resistor 14 receives input signals or the like to selectively instruct resistor 14 to provide heat to chamber 70 to heat ink contained therein.

According to an example embodiment, resistor 14 includes $WSi_xN_y$. According to various other example embodiments, the resistor may include any of a variety of materials, including, but not limited to TaAl, Ta $Si_xN_y$, and $TaAlO_x$.

A layer of material 20 (e.g., a protective layer) is provided substantially overlying resistor 14. Protective layer 20 is intended to protect resistor 14 from damage that may result from cavitation or other adverse effects due to any of a variety of conditions (e.g., corrosion from ink, etc.). According to an example embodiment, protective layer 20 includes tantalum or a tantalum alloy. According to other example embodiments, protective layer 20 may be formed of any of a variety of other materials, such as tungsten carbide (WC), tantalum carbide (TaC), and diamond like carbon.

A plurality of thin film layers 30 are provided substantially overlying protective layer 20. According to the example embodiment shown in FIG. 1, thin film layers 30 comprise four layers 32, 34, 36, and 38. According to other embodiments, a different number of layers (e.g., greater than four layers, etc.) may be provided. Layers 20, 32, 34, 36, and 38 (FIG. 1) may protect the substrate from inks used during operation of the printhead and/or act as adhesion layers or surface preparation layers for subsequently deposited material. According to other example embodiments, additional layers of material may be provided intermediate or between layer 20 and substratum 12. Such additional layers may be associated with logic and drive electronics and circuitry that are responsible for activating or firing resistor 14.

As shown in FIG. 1, layer 38 is a seed layer that may be used as a cathode during electrodeposition of overlying metal layers. According to an example embodiment, seed layer 38 comprises a metal such as gold or a gold alloy. According to other embodiments, the seed layer may comprise any of a variety of other metals or metal alloys such as nickel, nickel-chromium alloys, and copper. According to an example embodiment, seed layer 38 has a thickness of between 500 and 1,000 angstroms. According to other example embodiments, the thickness of seed layer 38 is between approximately 500 and 10,000 angstroms.

The various layers (e.g., layers 32, 34, 36, 38, and any additional layers provided intermediate layer 20 and substratum 12) can include conductors such as gold, copper, titanium, aluminum-copper alloys, and titanium nitride; tetraethylorthosilicate (TEOS) and borophosphosilicate glass (BPSG) layers provided for promoting adhesion between underlying layers and subsequently deposited layers and for insulating underlying metal layers from subsequently deposited metal layers; silicon carbide and $Si_xN_y$ for protecting circuitry in the printhead from corrosive inks; silicon dioxide, silicon, and/or polysilicon used for creating electronic devices such as transistors and the like; and any of a variety of other materials.

A layer 50 (hereinafter referred to as chamber layer 50) is provided substantially overlying thin film layers 30. According to an example embodiment, chamber layer 50 is formed of nickel or a nickel alloy. According to various other example embodiments, chamber layer 50 may comprise other metals or metal alloys such as one or more of gold (Au), gold-tin (AuSn) alloys, gold-copper (AuCu) alloys, nickel-tungsten (NiW) alloys, nickel-boron (NiB) alloys, nickel-phosphorous (NiP) alloys, nickel-cobalt (NiCo) alloys, nickel-chromium (NiCr) alloys, silver (Ag), silver-copper (AgCu) alloys, palladium (Pd), palladium-cobalt (PdCo) alloys, platinum (Pt), rhodium (Rh), and others. According to an example embodiment, the metal or metal alloy utilized for chamber layer 50 may be provided by an electroplating or electroless deposition process.

According to an example embodiment, chamber layer 50 has a thickness of between approximately 20 and 100 micrometers. According to other example embodiments, chamber layer 50 has a thickness of between approximately 5 and 50 micrometers.

A seed layer 52 is provided substantially overlying chamber layer 50 according to an example embodiment. Seed layer 52 is adapted or configured to promote adhesion between an overlying nozzle layer 60 and chamber layer 50. According to an example embodiment, seed layer 52 comprises nickel or a nickel alloy. According to other embodiments, seed layer 52 may comprise any of the metals or metal alloys described above with respect to chamber layer 50. Seed layer 52 has a thickness of between approximately 500 and 1,000 angstroms according to one example embodiment, and a thickness of between approximately 500 and 3,600 angstroms (or greater than 3,600 angstroms) according to various other embodiments.

While seed layer 52 is shown in FIG. 1 as being formed as a single layer of material, according to other example embodiments, such a seed layer may include more than one layer of material. For example, the seed layer may be formed of a first layer comprising tantalum followed by a second layer comprising gold. According to such an embodiment, the tantalum may be utilized to promote adhesion of the gold layer to the underlying chamber layer (e.g., chamber layer 50).

Nozzle layer 60 is provided substantially overlying chamber layer 50 and seed layer 52. According to an example embodiment, nozzle layer 60 has a thickness of between approximately 5 and 100 micrometers. According to other example embodiments, nozzle layer 60 has a thickness of between approximately 5 and 30 micrometers.

Chamber layer 60 is patterned to define opening 62 (e.g., an aperture or hole is provided in nozzle layer 60 to define opening 62). According to an example embodiment, opening 62 is formed as a relatively cylindrical aperture through nozzle layer 60, and may have a diameter of between approximately 10 and 20 micrometers. According to other example embodiments, the diameter of opening 62 is between approximately 4 and 45 micrometers.

According to an example embodiment, nozzle layer 60 comprises the same material as is used to form chamber layer 50. According to other example embodiments, chamber layer 50 and nozzle layer 60 may be formed of different materials.

FIGS. 2A through 2G are schematic cross-sectional views of a portion of a thermal ink jet printhead similar to that shown in FIG. 1 showing the steps of a manufacturing process according to an example embodiment.

Figure 2A:
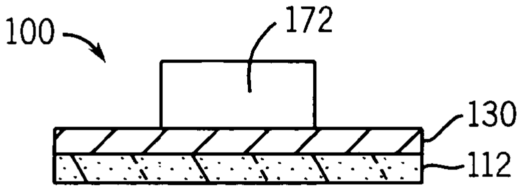
FIGS. 2A-2G are schematic cross-sectional views of a portion of a printhead similar to that shown in FIG. 1 showing the steps of a manufacturing process according to an example embodiment.

As shown in FIG. 2A, a thin film layer 130 is provided above a substratum 112. Thin film layer 130 may be similar to thin film layer 30 shown in FIG. 1, and may include a seed layer and any of a number of additional thin film layers such as those described with respect to FIG. 1. Thin film layer 130 is provided substantially overlying a resistor and protective layer (not shown) such as that shown in FIG. 1 as resistor 14 and protective layer 20, as are known in the art.

While thin film layer 130 is shown as a continuous layer, a portion of thin film layer 130 may be removed above the resistor, as shown in the example embodiment shown in FIG. 1. Removal of a portion of thin film layer 130 may occur either before or after the processing steps shown in FIGS. 2A-2G. For example, where such a portion is removed before the processing steps described in FIGS. 2A-2G, photoresist material may fill the removed portion during processing prior to its subsequent removal to form a chamber and nozzle such as chamber 70 and opening 62 such as those shown in FIG. 1. It should also be noted that the removal of a portion of similar thin film layers 230 and 330 may be performed before or after the process steps shown and described with respect to FIGS. 3A-3E and 4F-4D, respectively. For simplicity, each of the embodiments shown and FIGS. 2A-2G, 3A-3E and 4A-4D will be described as if removal of a portion of the film layers 130, 230 and 330 occurs after the formation of the chamber and nozzle.

As shown in FIG. 2A, a sacrificial material is provided substantially overlying thin film layer 130 and patterned to form a sacrificial structure or pattern 172. Sacrificial structure 172 may comprise a photoresist material, such as a positive or negative photoresist material, and may be provided according to any suitable means (e.g., lamination, spinning, etc.). According to one example embodiment, the sacrificial material used to form sacrificial structure 172 is a positive photoresist material such as SPR 220, commercially available from Rohm and Haas of Philadelphia, Pa. According to another example embodiment, the sacrificial material is a negative photoresist material such as a THB 151 N material commercially available from JSR Micro of Sunnyvale, Calif. or an SU8 photoresist material available from MicroChem Corporation of Newton, Mass.

According to other example embodiments, other sacrificial materials may be used for the sacrificial material, such as tetraethylorthosilicate (TEOS), spin-on-glass, and polysilicon. One advantageous feature of utilizing a photoresist material is that such material may be relatively easily patterned to form a desired shape. For example, according to an example process, a layer of photoresist material may be deposited or provided substantially overlying thin film layer 130 and subsequently exposed to radiation (e.g., ultraviolet (UV) light) to alter (e.g., solubize or polymerize) a portion of the photoresist material. Subsequent removal of exposed or nonexposed portions of the photoresist material (e.g., depending on the type of photoresist material utilized) will result in a relatively precise pattern of material.

Figure 2B:
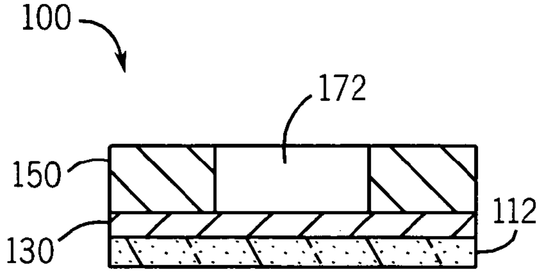

Subsequent to the formation or patterning of sacrificial structure 172, a layer 150 of metal is provided in FIG. 2B substantially overlying thin film layer 130 in areas not covered by sacrificial structure 172. In this manner, sacrificial structure 172 acts as a mandrel or mold around which metal may be deposited. Sacrificial structure 172 also acts to mask a portion of the underlying layers from having metal of layer 150 provided therein. While layer 150 is shown as being deposited such that its top surface is substantially planar with the top surface of sacrificial structure 172, layer 150 may be deposited to a level higher than the top surface of sacrificial structure 172 and polished or etched such that it is coplanar with the top surface of sacrificial structure 172.

According to an example embodiment, layer 150 is intended for use as a chamber layer such as chamber layer 50 shown in FIG. 1. Accordingly, layer 150 may be formed from any of a variety of metals and metal alloys such as those described above with respect to chamber layer 50. For example, according to one example embodiment, layer 150 comprises nickel or a nickel alloy. One method by which nickel may be provided for layer 150 (or for any other layer described herein which may include nickel) is the use of a Watts bath containing nickel sulphate, nickel chloride and boric acid in aqueous solution with organic additives (e.g., saccharine, aromatic sulphonic acids, sulfonamides, sulphonimides, etc.).

Layer 150 is deposited using an electrodeposition process according to an example embodiment. According to one example embodiment, layer 150 is deposited in a direct current (DC) electrodeposition process using Watts nickel chemistry. In such an embodiment, electrodeposition is conducted in a cup style plating apparatus. According to other embodiments, electrodeposition can be carried out in a bath style plating apparatus. The Watts nickel chemistry is composed of nickel metal, nickel sulfate, nickel chloride, boric acid and other additives that have a compositional range from 1 milligrams per liter to 200 grams per liter for each component.

According to the example embodiment, a resist pattern is first prepared on the wafer surface (which may include any of a variety of thin film layers such as layers 32, 34, 36, and 38 shown in FIG. 1), after which the wafer is prepared for deposition by dipping for 30 seconds in sulfuric acid. Other acids or cleaning techniques such as plasma etching or UV ozone cleaning may be utilized in other embodiments. The wafer is then placed in the plating apparatus and electrodeposition begins by setting the DC power source to plate at a current density of approximately 3 amperes per square decimeter (amps/$dm^2$). In other embodiments, electrodeposition can utilize a current density range of between approximately 0.1 to 10 amps/$dm^2$ depending on the plating chemistry used and the desired plating rates (higher current densities can result in higher plating rates). These conditions can be used for deposition of the chamber and nozzle layers described with respect to the embodiment shown in FIGS. 2A-2F and in either of the embodiments illustrated in FIGS. 3A-3E and FIGS. 4A-4D.

According to another example embodiment, layer 150 may be provided in an electroless deposition process or any other process by which metal may be deposited onto thin film layer 130 (e.g., physical vapor deposition techniques such as a sputter coating, chemical vapor deposition techniques, etc.).

Figure 2C:
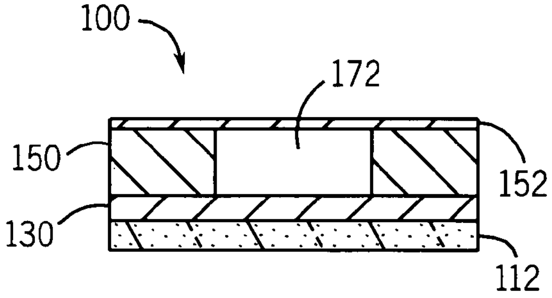

As shown in FIG. 2C, a layer of metal 152 (e.g., a seed layer) is provided substantially overlying both sacrificial structure 172 and layer 150. According to another example embodiment, layer 152 may be omitted. Layer 152 may be formed of similar materials as described with respect to layer 52 with regard to FIG. 1. Layer 152 may be deposited in any suitable process (e.g., physical vapor deposition, evaporation, electroless deposition, etc.). As described above with respect to layer 52, layer 152 may comprise a single layer of material or multiple layers of material (e.g., a first layer comprising tantalum and a second layer comprising gold, etc.).

Figure 2D:
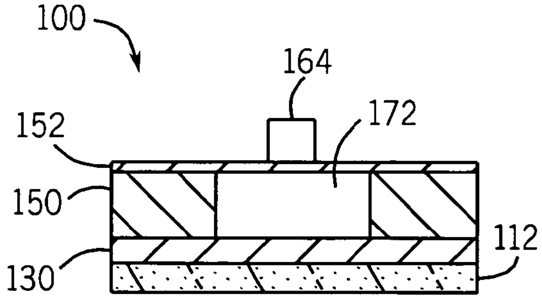

In FIG. 2D, a sacrificial structure 164 is provided substantially overlying layer 152 and aligned with sacrificial structure 172 using conventional photolithography masking and deposition methods. Sacrificial structure 164 may be formed of the same material as used to form sacrificial structure 172, or may differ therefrom. As with sacrificial structure 172, sacrificial structure 164 is formed by photolithographic methods from a layer of sacrificial material (e.g., positive or negative photoresist, etc.).

Figure 2E:
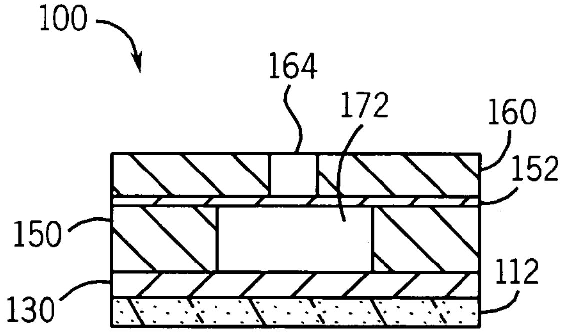

In FIG. 2E, a layer 160 of metal (similar to that provided as nozzle layer 60 in FIG. 1) is provided substantially overlying layer 152 in areas not covered by sacrificial structure 164. Layer 160 may be formed of a material similar to that used for nozzle layer 60 described with respect to FIG. 1.

Figure 2F:
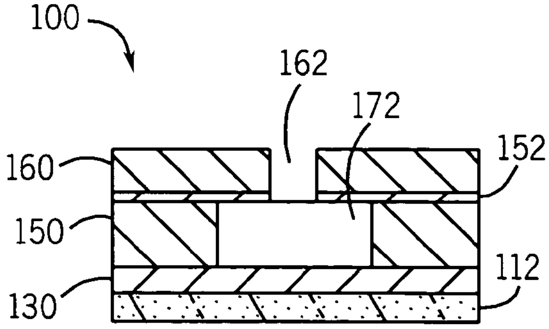
Figure 2G:
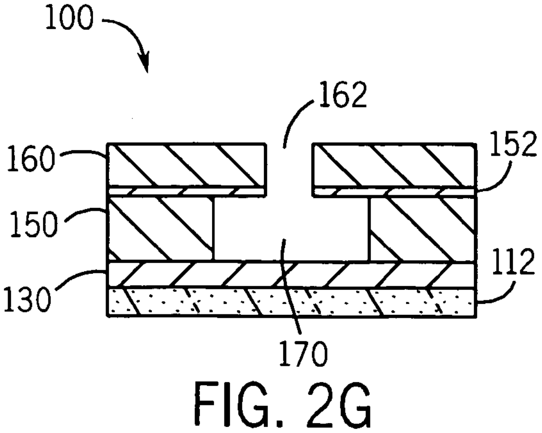

A chamber 170 and nozzle 162 are formed as shown in FIGS. 2F and 2G. As shown in FIG. 2F, sacrificial structure 164 is removed to form a nozzle 162. According to an example embodiment, sacrificial structure 164 is removed using any of a variety of methods. For example, sacrificial structure 164 may be removed with a solvent develop process, an oxygen plasma, an acid etch, or any of a variety of other processes suitable for removal of sacrificial structure 164.

As also shown in FIG. 2F, a portion of layer 152 underlying nozzle 162 is removed to expose an upper or top surface of sacrificial structure 172. Removal of the portion of layer 152 may be accomplished using a wet or dry etch or other process. According to an example embodiment in which layer 152 is formed of nickel or a nickel alloy, a dilute nitric acid etch may be utilized. According to another example embodiment in which gold or a gold alloy is used to form layer 152, a potassium iodide etch may be utilized. Any of a variety of etchants may be utilized that are suitable for removal of the portion of layer 152 (e.g., depending on the composition of layer 152, etc.). One consideration that may be utilized in choosing an appropriate etchant is the goal of avoiding damage to the metal utilized to form layers 150 and 160.

After the top or upper surface of sacrificial structure 172 is exposed (as shown in FIG. 2F), sacrificial structure 172 is removed as shown in FIG. 2G. Removal of sacrificial structure 172 may be accomplished using a similar method as described above with respect to sacrificial structure 164.

As shown in FIG. 2G, removal of sacrificial structures 164 and 172 and etching of a portion of layer 152 results in a structure including a chamber 170 for storage of ink for printhead 100 and a nozzle 162 for ejection of ink from chamber 170. While FIG. 2G shows chamber 170 provided substantially overlying thin film layers 130, all or a portion of thin film layers 130 underlying chamber 170 may be removed in a subsequent etching step. According to another example embodiment, thin film layers 130 may be etched prior to deposition of sacrificial structures 172 and 164. Other components of printhead 100 may also be formed prior to or after the formation steps described with respect to FIGS. 2A through 2G. For example, one or more ink feed channels 15 may be formed to provide ink to chamber 170 prior or subsequent to the formation of the structure shown in FIG. 2G.

FIGS. 3A to 3E are schematic cross-sectional views of a portion of a thermal ink jet printhead 200 similar to that shown in FIG. 1 showing the steps of a manufacturing process according to another example embodiment. In contrast to the example embodiment described with respect to FIGS. 2A to 2F, the example embodiment shown in FIGS. 3A to 3E utilizes a sacrificial structure that is formed prior to metal deposition used to form a chamber layer and a nozzle layer. In this embodiment, a metal layer such as a seed layer 152 (see, e.g., FIGS. 2A to 2F) is not required between a chamber layer and a nozzle layer.

Figure 3A:
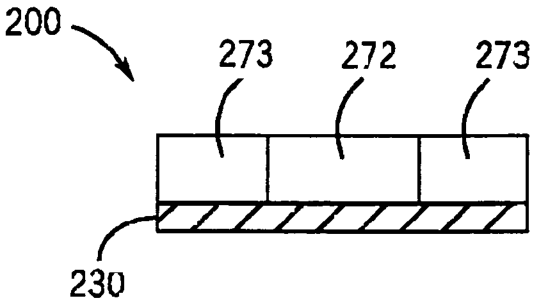
FIGS. 3A-3E are schematic cross-sectional views of a portion of a printhead similar to that shown in FIG. 1 showing the steps of a manufacturing process according to another example embodiment.
Figure 3B:
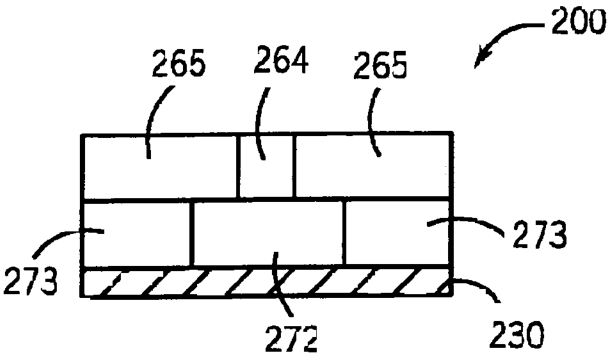

As shown in FIG. 3A, a first layer of sacrificial material is provided or formed substantially overlying a thin film layer 230 similar to that described above with respect to thin film layer 130. Once deposited, the first layer of sacrificial material will be patterned to define regions to be removed and regions to remain (i.e., that will be used to form a portion of a sacrificial structure). According to an example embodiment in which a negative photoresist material is provided substantially overlying thin film layer 230, the photoresist material is patterned by exposing the photoresist material to radiation such as ultraviolet light to form exposed portion 272 and unexposed portions 273. In this embodiment, exposed portions 272 polymerize in response to the exposure to ultraviolet light, and will act as a portion of a sacrificial structure to be used in the formation of a chamber and nozzle (see FIG. 3E). According to another embodiment, in which a positive photoresist is utilized, portion 272 may be unexposed and portions 273 may be exposed to ultraviolet light.

A second layer of sacrificial material is provided substantially overlying the first layer of sacrificial material and patterned to define at least one portion or region to be removed and to define a portion or region that will remain to form another portion of a sacrificial structure. Patterning may be accomplished in a manner similar to that described with reference to the first layer of sacrificial material, such as by exposing a portion of the second layer of sacrificial material to radiation such as ultraviolet light. In this manner, an exposed portion 264 and an unexposed portion 265 (or vice-versa where a positive photoresist material is utilized) is formed in the second layer of sacrificial material.

Figure 3C:
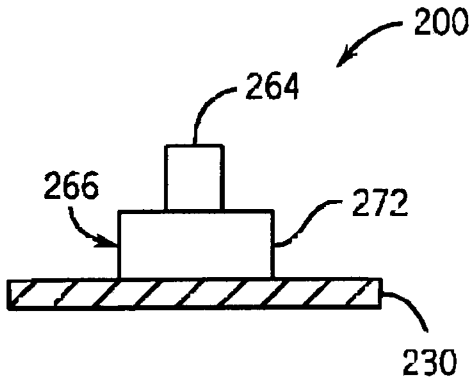

Subsequent to the exposure of portions of the first and second layers of sacrificial material, portions of each of the first and second layers are removed to form a sacrificial structure that may be used to define a chamber and nozzle for the printhead. In FIG. 3C, portions 273 and 265 are removed according to an example embodiment. The removal of portions of the photoresist results in the formation of a sacrificial structure 266 having a top or upper portion 264 to be used in the formation of a nozzle for printhead 200 and a bottom or lower portion 272 to be used in the formation of an ink chamber and ink manifold for printhead 200.

According to an example embodiment, the first and second layers of sacrificial materials used to form portions 264 and 272 are formed of the same material and are deposited in two separate deposition steps. In another example, the first and second layers of sacrificial materials are formed of a single layer of material formed in a single deposition step. In yet another example, the first and second layers of sacrificial materials used to form portions 264 and 272 are formed of different materials (e.g., a positive photoresist for one layer and a negative photoresist for the other layer).

Figure 3D:
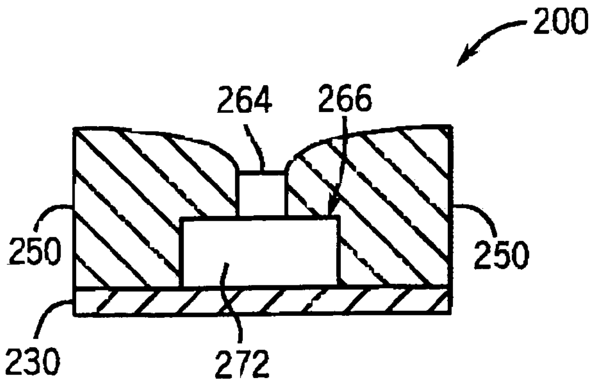

As shown in FIG. 3D, a layer 250 of metal is provided or deposited substantially overlying the thin film layer 230 and adjacent to portions 264 and 272 of sacrificial structure 266. According to an example embodiment, metal used to form layer 250 may be material similar to that described with respect to chamber layer 50 and nozzle layer 60 described with regard to FIG. 1. Metal used to form layer 250 may be provided using any acceptable deposition method, including electrodeposition, electroless deposition, physical vapor deposition, chemical vapor deposition, etc. According to an example embodiment in which the metal used to form layer 250 is deposited in a direct current electrodeposition (DC) process, the metal is provided such that it is level or slightly below the level of the top or upper surface of portion 264 of the sacrificial structure 266. As shown in FIG. 3D, the metal used to form layer 250 increases in thickness at distances away from portion 264. One reason for this is that as layer 250 thickens beyond the height of portion 272, the metal is deposited both vertically and laterally on top of portion 272, thus slowing the vertical deposition rate in the vicinity of portion 272. Once the lateral deposition of layer 250 stops, the deposition rate of layer 250 is the same everywhere (including substantially overlying portion 272 and adjacent portion 264).

Figure 3E:
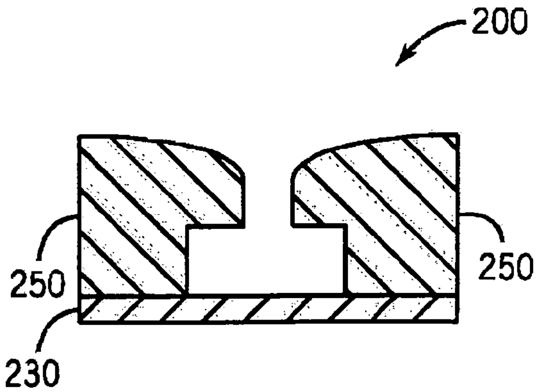

As shown in FIG. 3E, sacrificial structure 266 is removed after layer 250 is provided. Removal of sacrificial structure 266 may be accomplished using methods similar to those described above with respect to sacrificial structures 164 and 172. As described above with respect to FIGS. 2A through 2F, other processing steps may be utilized either prior or subsequent to the formation of the structure shown in FIG. 3E.

According to an example embodiment, the top or upper surface of metal layer 250 may be planarized using a chemical mechanical polish technique or other similar technique. One advantageous feature of performing such a planarization step is that the entire surface of printhead 200 will have a relatively flat or planar characteristic around the nozzle.

FIGS. 4A to 4D are schematic cross-sectional views of a portion of a printhead 300 similar to that shown in FIG. 1 showing the steps of a manufacturing process according to another example embodiment. Similar to the embodiment shown with respect to FIGS. 3A to 3E, one feature of the embodiment shown in FIGS. 4A to 4D is the formation of an entire sacrificial structure prior to the deposition of metal used to form a printhead structure.

Figure 4A:
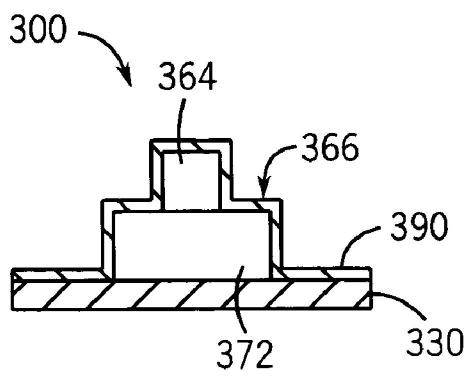
FIGS. 4A-4D are schematic cross-sectional views of a portion of a printhead similar to that shown in FIG. 1 showing the steps of a manufacturing process according to a further example embodiment.

As shown in FIG. 4A, a sacrificial structure 366 having a top or upper portion 364 and a bottom or lower portion 372 is formed substantially overlying a thin film layer 330. As with structures 264 and 272 described above with respect to FIGS. 3A to 3E, top portion 364 is utilized to form a nozzle and bottom portion 372 is utilized to form an ink chamber or ink manifold. The sacrificial structure 366 may be formed in a manner similar to that described above with respect to FIGS. 3A to 3E (i.e., utilizing the successive deposition, patterning and removal of a portion of two separate photoresist layers).

As also shown in FIG. 4A, a layer 390 of metal is provided substantially overlying the sacrificial structure 366 and the surface of thin film layers 330 not covered by sacrificial structure 366. Any of a variety of deposition methods may be used to form layer 390, including physical vapor deposition, evaporation, chemical vapor deposition, electrodeposition, electroless deposition, autocatalytic plating, etc. Layer 390 is intended to act as a seed layer for overlying metal layers used to form the printhead structure. According to an example embodiment, layer 390 may have a thickness of between approximately 500 and 3,000 angstroms. According to other example embodiments, layer 390 may have a thickness of between 500 angstroms and 2 micrometers.

Layer 390 may include a relatively inert metal such as gold, platinum and/or gold and platinum alloys. According to other embodiments, layer 390 may include palladium, ruthenium, tantalum, tantalum alloys, chromium and/or chromium alloys.

Figure 4B:
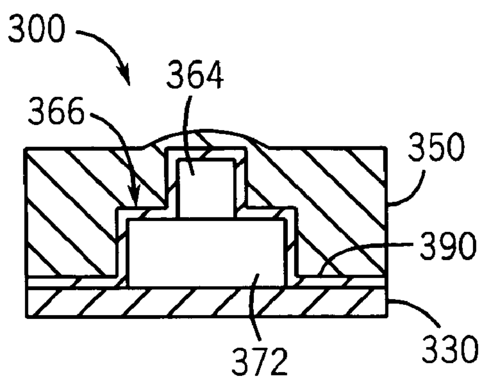

As shown in FIG. 4B, a layer 350 of metal is provided or deposited substantially overlying layer 390 (i.e., substantially overlying and around sacrificial structure 366 and substantially overlying portions of thin film layers 330 not covered by sacrificial structure 366). The material used to form layer 350 may be similar to that used to form chamber layer 50 and the nozzle layer 60 as shown in FIG. 1. As shown in FIG. 4B, a portion of the metal used to form layer 350 extends substantially overlying a top surface of a top portion 364 of sacrificial structure 366.

Figure 4C:
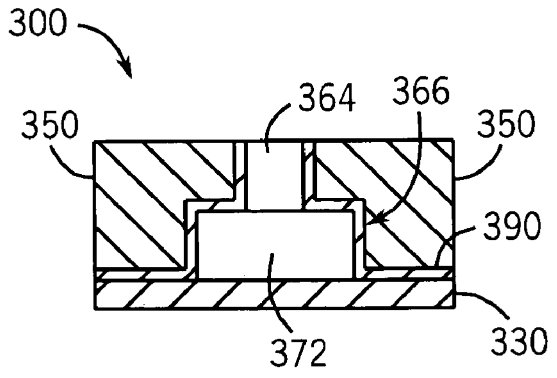

According to an example embodiment shown in FIG. 4C, a planarization process is used to planarize the top surface of layer 350 and sacrificial structure 366. According to an example embodiment, a chemical mechanical polish technique is utilized to planarize the top surface of layer 350 and sacrificial structure 366.

Figure 4D:
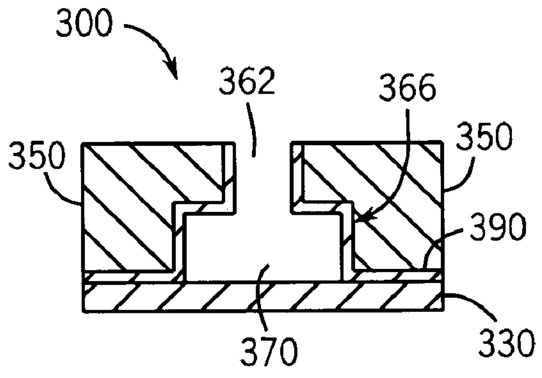

Sacrificial structure 366 is removed as shown in FIG. 4D using methods similar to those described above with respect to sacrificial structure 266. The result is the formation of a chamber 370 and a nozzle 362 similar to chamber 70 and opening 62 shown in FIG. 1. As described above, additional processing steps may be performed prior or subsequent to the formation of the structure shown in FIG. 4D.

As an optional step (not shown), a layer of metal similar or identical to that used to form layer 390 may be provided substantially overlying a top surface of layer 350. One advantageous feature of such a configuration is that layer 350 may be effectively encapsulated or clad to prevent damage from inks or other liquids. In this manner, relatively inert metals (e.g., gold, platinum, etc.) may be utilized to form the wall or surface that is in contact with ink used by the printhead, while a relatively less expensive material (e.g., nickel) may be used as a "filler" material to form the structure for the chamber and nozzle.

Figure 5:
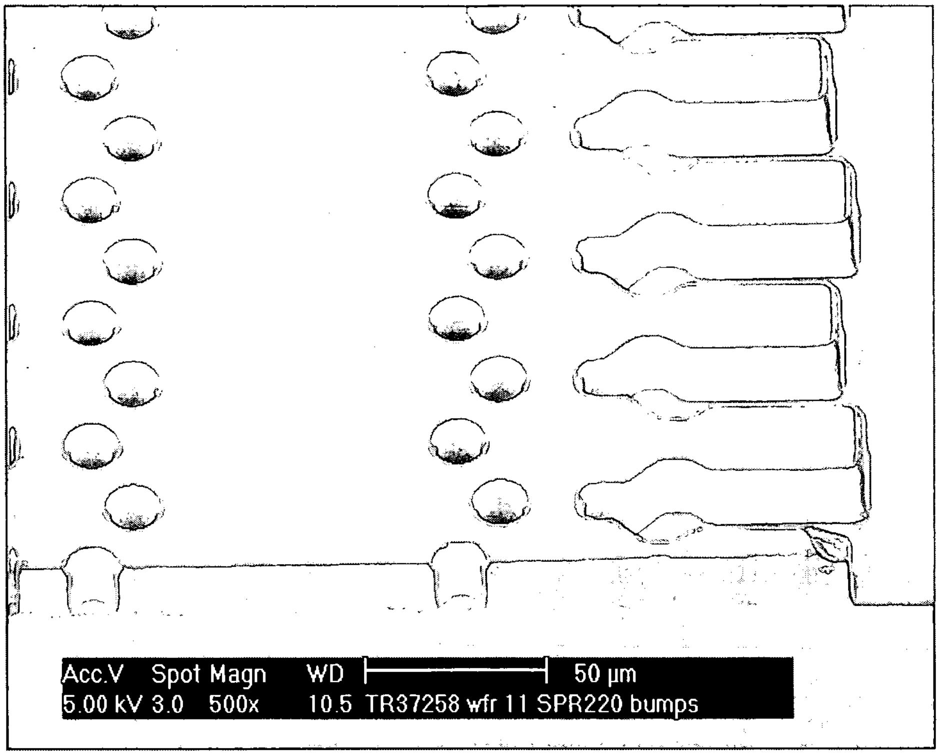
FIG. 5 is a scanning electron micrograph showing a sacrificial layer formed of a positive photoresist material according to an example embodiment.
Figure 6:
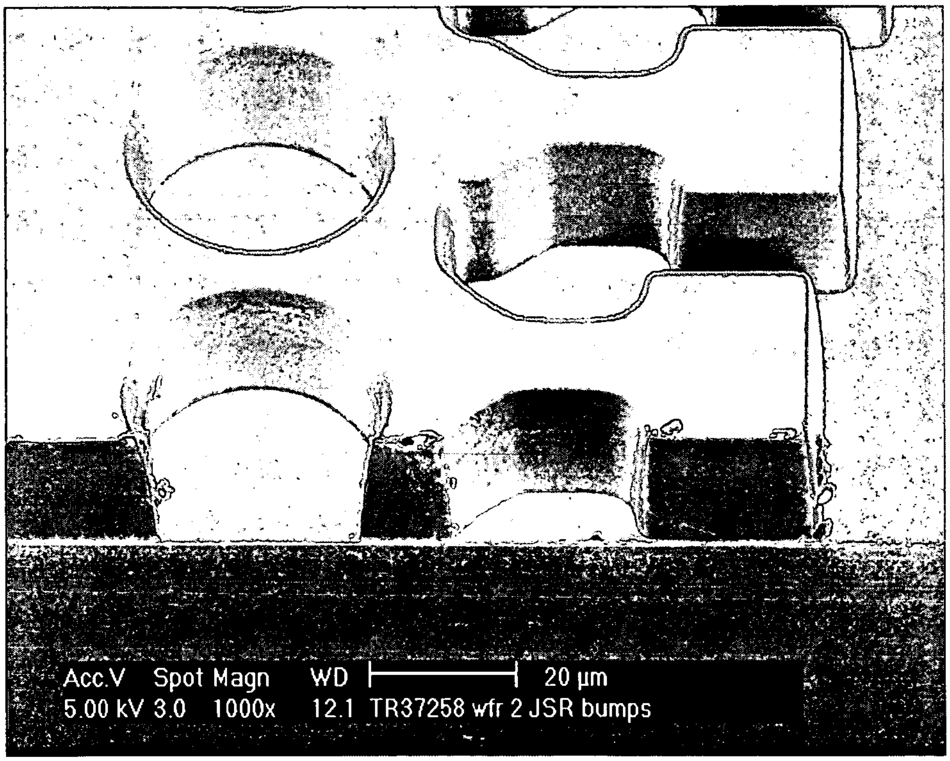
FIG. 6 is a scanning electron micrograph showing a sacrificial layer formed of a negative photoresist material according to an example embodiment.
Figure 7:
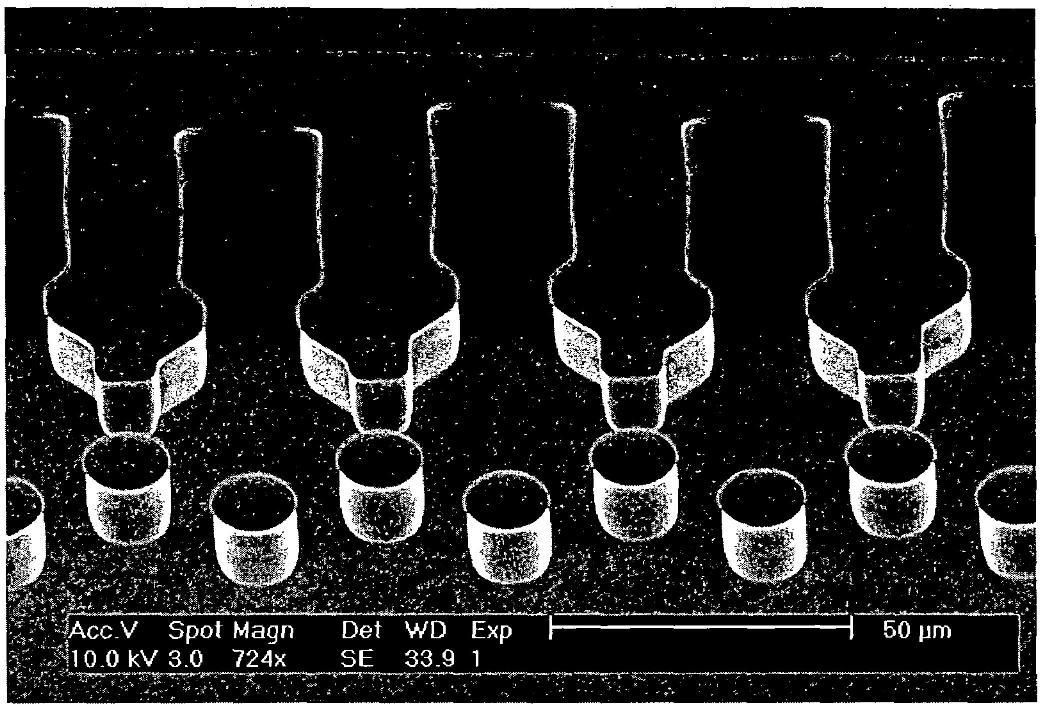
FIG. 7 is a scanning electron micrograph showing a number of ink jet printhead chambers subsequent to the removal of the positive photoresist material shown in FIG. 5.
Figure 8:
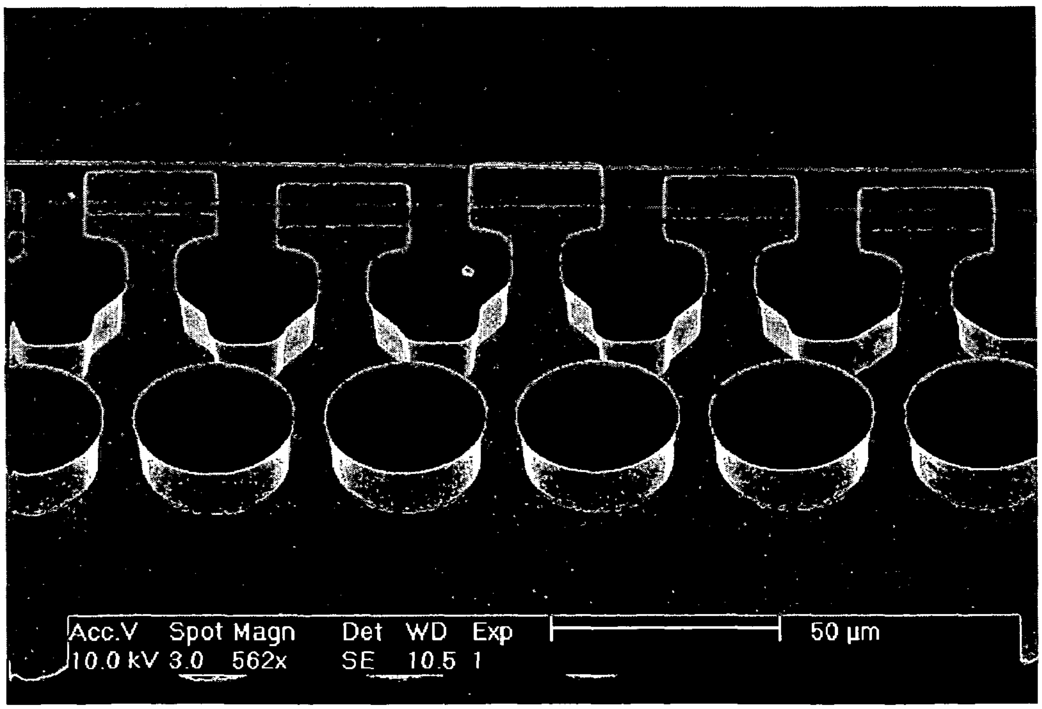
FIG. 8 is a scanning electron micrograph showing a number of ink jet printhead chambers subsequent to the removal of the negative photoresist material shown in FIG. 6.

FIGS. 5 to 8 are scanning electron micrographs illustrating the formation of ink jet printhead chambers according to example embodiments. FIG. 5 shows a chamber level sacrificial structure formed of a positive photoresist, magnified at 500 times. FIG. 6 shows a similar chamber level sacrificial structure formed from a negative photoresist material magnified at 1,000 times. FIGS. 7 and 8 show the formation of chambers subsequent to the removal of the sacrificial photoresist structures shown in FIGS. 5 and 6, respectively. FIG. 5 illustrates the initial shape of the resist mandrel created from the SPR220 resist. The shape of the walls of the plated material in FIG. 7 conform to the initial shape of the plating resist shown in FIG. 5. FIGS. 6 and 8 show that nickel plated around the JSR THB 151N resist also conforms well to the resist shape. FIGS. 7 and 8 also illustrate that it is possible to deposit structures that have a relatively flat or planar surface.

It should be noted that the construction and arrangement of the elements of the printhead and other structures as shown in the preferred and other example embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited herein. It should be noted that the elements and/or assemblies of the system may be constructed from any of a wide variety of materials that provide sufficient strength or durability. Other substitutions, modifications, changes and omissions may be made in the design, operating conditions and arrangement of the example embodiments without departing from the scope of the present inventions.

What is claimed is:

1. A method for manufacturing a fluid ejection device comprising:

providing a sacrificial structure overlying a portion a semiconductor substrate, the sacrificial structure having a shape configured to define an ink chamber, ink manifold, and a nozzle;

providing a first metal substantially overlying the sacrificial structure and substantially overlying the substrate; and removing the sacrificial structure to form the ink chamber, ink manifold, and nozzle, wherein the sacrificial structure includes a first portion for defining the nozzle and a second portion for defining the ink chamber and ink manifold and is formed by depositing a first sacrificial material substantially overlying the substrate and a second sacrificial material substantially overlying the first sacrificial material, exposing the first sacrificial material to radiation before depositing the second sacrificial material, and removing a portion of the first and second sacrificial materials to form the sacrificial structure.

2. The method of claim 1, wherein the second portion has a greater width than the first portion.

3. A method for manufacturing a fluid ejection device comprising:

providing a sacrificial structure overlying a portion a semiconductor substrate, the sacrificial structure having a shape configured to define an ink chamber, ink manifold, and a nozzle;

providing a first metal substantially overlying the sacrificial structure and substantially overlying the substrate; and removing the sacrificial structure to form the ink chamber, ink manifold, and nozzle, wherein the formation of the sacrificial structure includes exposing the second sacrificial material to radiation before removing a portion of the second sacrificial material.

4. A method for manufacturing a fluid ejection device comprising:

providing a sacrificial structure overlying a portion a semiconductor substrate, the sacrificial structure having a shape configured to define an ink chamber, ink manifold, and a nozzle:

providing a first metal substantially overlying the sacrificial structure and substantially overlying the substrate; and removing the sacrificial structure to form the ink chamber, ink manifold, and nozzle, further comprising providing a second metal within the sacrificial structure, wherein the second metal comprises at least one of gold, platinum, a gold alloy, and a platinum alloy.

5. The method of claim 4, wherein the first metal comprises at least one of nickel and a nickel alloy.

6. The method of claim 5, wherein the first metal comprises nickel and at least one of tungsten, boron, phosphorous, cobalt, and chromium.

7. The method of claim 4, wherein the first metal comprises at least one of gold, gold-tin alloys, gold-copper alloys, silver, silver-copper alloys, palladium, palladium-cobalt alloys, platinum, and rhodium.

8. A method for manufacturing a fluid ejection device comprising:

providing a sacrificial structure overlying a portion a semiconductor substrate, the sacrificial structure having a shape configured to define an ink chamber, ink manifold, and a nozzle;

providing a first metal substantially overlying the sacrificial structure and substantially overlying the substrate; and removing the sacrificial structure to form the ink chamber, ink manifold, and nozzle, wherein the sacrificial structure comprises a photoresist material.

9. The method of claim 8, wherein the sacrificial structure comprises a negative photoresist material.

10. The method of claim 8 further comprising providing a plurality of thin film layers substantially overlying the substrate and below the sacrificial structure before providing the sacrificial structure.

11. A method for manufacturing a fluid ejection device comprising:

providing a sacrificial structure overlying a portion a semiconductor substrate, the sacrificial structure having a shape configured to define an ink chamber, ink manifold, and a nozzle;

providing a first metal substantially overlying the sacrificial structure and substantially overlying the substrate; and removing the sacrificial structure to form the ink chamber, ink manifold, and nozzle, wherein the first metal comprises nickel and the step of providing the first metal comprises utilizing a Watts bath.

12. A method for manufacturing a fluid ejection device comprising:

providing a first layer of sacrificial material substantially overlying a semiconductor substrate;

exposing a portion of the first layer of sacrificial material to radiation;

providing a second layer of sacrificial material substantially overlying the first layer after exposing the first layer;

removing a portion of the second layer;

removing a portion of the first layer, the second portion underlying the first portion and having a width greater than the width of the first portion;

depositing a metal substantially overlying the substrate and substantially overlying the first portion and the second portion; and removing the first portion and the second portion to form an ink chamber, ink manifold, and a nozzle for the printhead.

13. The method of claim 12, further comprising exposing a portion of the second layer to radiation before the step of removing a portion of the second layer.

14. The method of claim 12, wherein the first portion defines the nozzle and the second portion defines the ink chamber and ink manifold.

15. The method of claim 12, further comprising providing a layer of metal in contact with the first portion and the second portion before depositing the metal substantially overlying the substrate and adjacent the first portion and the second portion.

16. The method of claim 15, wherein the layer of metal in contact with the first portion and the second portion comprises at least one of gold, platinum, a gold alloy, and a platinum alloy.

17. The method of claim 16, wherein the metal deposited substantially overlying the substrate and adjacent the first portion and the second portion comprises at least one of nickel and a nickel alloy.

18. The method of claim 17, further comprising providing a layer of metal substantially overlying the metal deposited substantially overlying the substrate and adjacent the first portion and the second portion to clad the metal deposited substantially overlying the substrate and adjacent the first portion and the second portion.

19. The method of claim 12, wherein at least one of the first layer and the second layer comprises a negative photoresist material.

20. The method of claim 19, wherein the first layer comprises a negative photoresist material and the step of exposing a portion of the first layer to radiation comprises exposing a portion of the first portion to ultraviolet light, the exposed portion defining the second portion of the sacrificial structure.

21. The method of claim 12, further comprising providing a plurality of thin film layers substantially overlying the substrate and below the first layer of sacrificial material.

22. The method of claim 21, further comprising removing a portion of the thin film layers.

23. The method of claim 12, wherein the first portion has a first surface and the metal deposited substantially overlying the substrate and adjacent the first portion and the second portion is provided substantially overlying the first surface.

24. The method of claim 23, further comprising removing at least a portion of the metal provided substantially overlying the first surface of the first portion.

25. The method of claim 12, further comprising providing a protective layer substantially overlying the substrate prior to providing the first layer of sacrificial material.

26. A method for manufacturing a fluid ejection device having a nozzle and an ink chamber, the method comprising:

forming a sacrificial structure having an upper portion for defining a nozzle and a lower portion for defining a chanter;

providing a first metal substantially overlying at least a portion of the sacrificial material;

providing a second metal substantially overlying the first metal, the second metal comprising a different material than the first metal; and removing the sacrificial structure to form the ink chamber and the nozzle.

27. The method of claim 26, wherein the sacrificial structure is formed by providing a first sacrificial material and exposing a portion of the first sacrificial material to radiation, providing a second sacrificial material substantially overlying the first sacrificial material after the exposure of the first sacrificial material, and removing portions of the first and second sacrificial materials to form the sacrificial structure.

28. The method of claim 26, wherein the first metal comprises at least one of gold, platinum, palladium, and chromium.

29. The method of claim 28, further comprising providing a third metal substantially overlying the second metal to encapsulate the second metal, the third metal comprising at least one of gold, platinum, palladium, and chromium.

30. The method of claim 26, wherein the sacrificial structure comprises a negative photoresist material.

31. The method of claim 26, wherein the sacrificial structure comprises a positive photoresist material.

32. The method of claim 26, wherein at least one of the steps of providing the first metal and providing the second metal comprises utilizing one of an electrodeposition process and an electroless deposition process.

33. The method of claim 26, further comprising providing a plurality of thin film layers below the sacrificial structure prior to providing the sacrificial structure.

34. The method of claim 33, further comprising removing a portion of the thin film layers prior to forming the sacrificial structure.

35. The method of claim 34, wherein a protective layer is provided substantially overlying at least some of the thin film layers.

36. A method for manufacturing a fluid ejection device, comprising:

providing a first layer of sacrificial material substantially overlying a semiconductor substrate;

exposing a portion of the first layer of sacrificial material to radiation;

providing a second layer of sacrificial material substantially overlying the first layer after exposing the first layer;

removing a part of the second layer leaving a first portion remaining;

removing a part of the first layer leaving a second portion remaining, the second portion underlying the first portion and having a width greater than the width of the first portion;

depositing a first metal substantially overlying the substrate, the first portion, and the second portion; and removing the first portion and the second portion to form an ink chamber, ink manifold, and a nozzle for the fluid ejection device.

37. The method of claim 36, further comprising providing a layer of metal in contact with the first portion and the second portion before depositing the first metal.

38. The method of claim 37, wherein the layer of metal in contact with the first portion and the second portion comprises at least one of gold, platinum, a gold alloy, and a platinum alloy.

39. The method of claim 38, wherein the first metal comprises at least one of nickel and a nickel alloy.

40. The method of claim 39, further comprising providing a layer of metal substantially overlying the first metal to clad the first metal.

41. The method of claim 36, wherein the first portion has a first surface, and wherein the first metal is provided substantially overlying the first surface.

* * * * *

UNITED STATES PATENT AND TRADEMARK OFFICE

CERTIFICATE OF CORRECTION

PATENT NO. : 7,293,359 B2
APPLICATION NO. : 10/834777
DATED : November 13, 2007
INVENTOR(S) : Mohammed S. Shaarawi et al.

It is certified that error appears in the above-identified patent and that said Letters Patent is hereby corrected as shown below:

In column 11, line 14, in Claim 4, after “nozzle” delete “:” and insert -- ; --, therefor.

In column 11, line 47, in Claim 10 after “8” insert -- , --.

In column 13, line 3, in Claim 26, delete “chanter” and insert -- chamber --, therefor.

Signed and Sealed this

Twenty-seventh Day of May, 2008

JON W. DUDAS
*Director of the United States Patent and Trademark Office*